United States Patent [19]
Russell

[11] Patent Number: 5,347,723
[45] Date of Patent: Sep. 20, 1994

[54] AIR BEARING CONTROL SYSTEM

[75] Inventor: Gary W. Russell, East Greenwich, R.I.

[73] Assignee: Brown & Sharpe Mfg. Co., Kingston, R.I.

[21] Appl. No.: 988,467

[22] Filed: Dec. 10, 1992

[51] Int. Cl.⁵ .............................................. G01B 21/04
[52] U.S. Cl. ........................................ 33/503; 33/517; 33/DIG. 2
[58] Field of Search .............. 33/503, 504, 1 M, 517, 33/DIG. 2

[56] References Cited

U.S. PATENT DOCUMENTS

| | | |
|---|---|---|
| 3,720,288 | 3/1973 | Tschabold . |
| 4,535,812 | 8/1985 | Miller . |
| 4,610,089 | 9/1986 | Bell et al. ............................ 33/503 |
| 4,941,265 | 7/1990 | Heiland ............................... 33/503 |
| 4,949,465 | 8/1990 | Pesikov ............................... 33/503 |

Primary Examiner—Christopher W. Fulton
Attorney, Agent, or Firm—Wolf, Greenfield & Sacks

[57] ABSTRACT

The invention comprises a machine having air bearings and a control apparatus for turning off one or more of the air bearings when the machine has been idle for a specified time period.

21 Claims, 3 Drawing Sheets

AIR BEARING CONTROL SYSTEM

FIELD OF THE INVENTION

The invention relates to air bearings. More particularly, the invention relates to a system for reducing air consumption of an air bearing during periods of non-use.

BACKGROUND OF THE INVENTION

A bearing, as used herein, generally refers to the area where a first part of a machine supports another part which can move relative to the first part. An air bearing is a particular type of bearing in which a stream of pressurized air is forced through a gap between the two parts to maintain relatively frictionless support.

Air bearings are commonly used in coordinate measuring machines in order to provide essentially frictionless movement between parts, thus allowing high speed movement and accurate placement. Air bearings, however, require a large amount of pressurized air per unit time and thus have relatively high operating costs. Typically, an air compressor is run to supply a holding tank with enough air to keep the pressure in the tank between specified minimum and maximum levels. Air is released to the air bearing through a valve, a pressure regulator, and an outlet which leads from the tank to the bearing. The compressor is electrically feedback controlled to maintain the pressure in the holding tank within the specified pressure range, e.g., 10–12 atmospheres. Thus, when a pressure sensor indicates that the pressure in the tank is greater than 12 atmospheres, the compressor turns off; and when the pressure in the tank drops to below 10 atmospheres, the compressor turns on again. When the valve to the air bearing is open, the air which is being relieved from the tank to the air bearing must constantly be replenished by the compressor. Accordingly, when the air bearing is operating, the air compressor is on and operating most, if not all, of the time. Air compressors have relatively high energy consumption. Thus, maintaining the pressure in the air bearings of a machine is relatively costly.

Therefore, it is an object of the present invention to conserve air consumed by air bearings.

It is a further object of the present invention to provide an improved air bearing control system.

It is yet another object of the present invention to provide a coordinate measuring machine comprising air bearings having reduced operating costs.

SUMMARY OF THE INVENTION

The invention comprises a digital controller coupled to an outlet valve which controls air flow between an air storage tank and the air bearings for opening and closing the valve responsive to certain inputs. In particular, the controller is coupled to receive inputs from the main machine controller. If the machine is in the full operation mode, but is inactive for a specified period of time, e.g., three minutes, the valve controller causes the machine to enter a standby mode by shutting the valve, thus turning the air bearing off, and halting depletion of the air from the air storage tank. Accordingly, the air compressor can then turn off during machine idle periods because air in the tank will not be depleted through the air bearing.

The main controller of the machine, in turn, is coupled to receive a signal from the air bearing controller which indicates whether the air bearing is on or off. The main controller is programmed so as not to accept control inputs until the air bearing is on. When in the standby mode, the air bearing is turned on by operation of an input device such as a push button, a mouse, a light pen or touch screen. In response to the input signal, the valve controller and the main controller open the tank outlet valve and return the machine to full operation mode, respectively.

BRIEF DESCRIPTION OF THE DRAWINGS

The invention will be better understood from the following detailed description of a preferred embodiment when taken in consideration with the drawings, of which.

DETAILED DESCRIPTION OF A PREFERRED EMBODIMENT OF THE INVENTION

Figure 1:
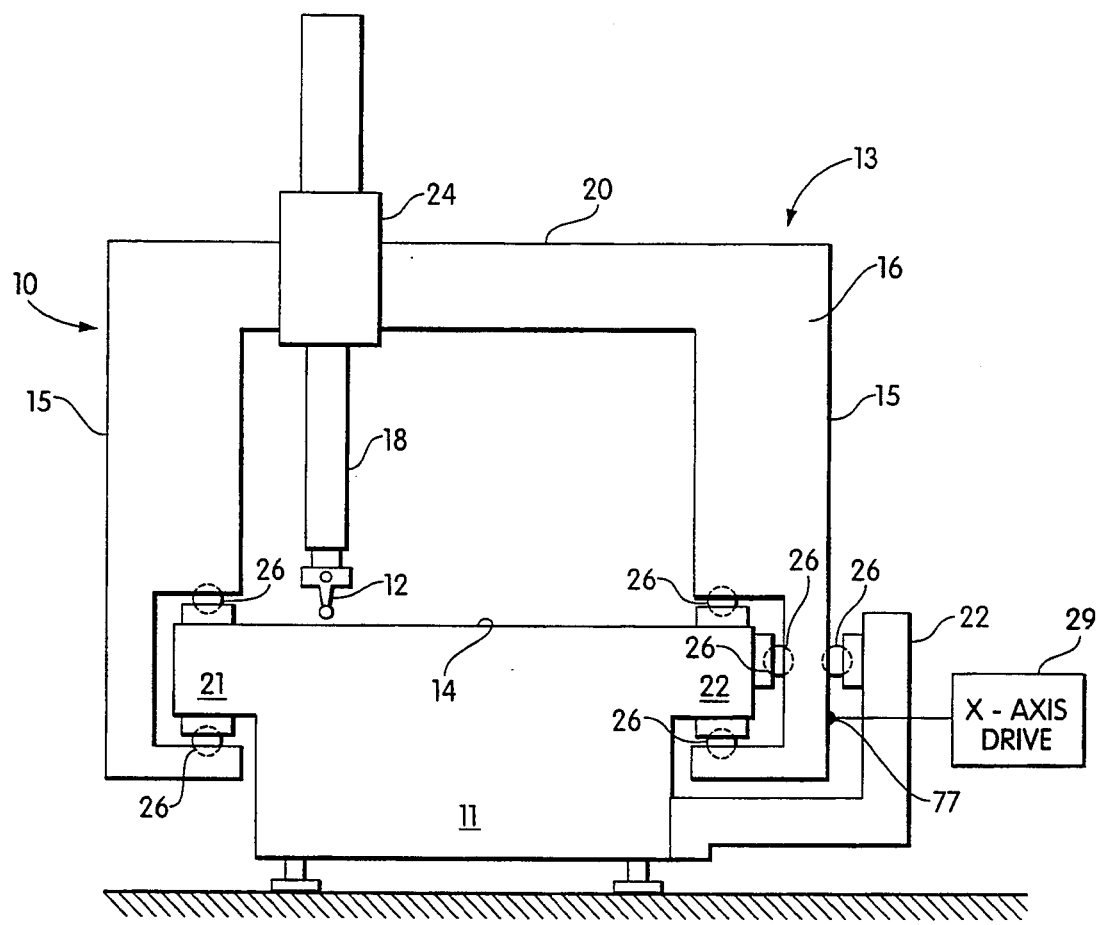
FIG. 1 is an front plan view of a typical prior art bridge type coordinate measuring machine comprising air bearings.

FIG. 1 is a front plan view of an exemplary three-axis bridge type coordinate measuring machine having air bearings. An object to be measured is placed on table 14 and is contacted by probe 12 which is mounted on z-rail 18. Z-rail 18 can move vertically within an air bearing (not shown) in air bearing carriage 24, thus providing a vertical motion component to probe 12 (z-axis component). Air bearing carriage 24 is further mounted on beam 20 by a second air bearing (not shown). Carriage 24 is movable in the horizontal direction (the x direction) along x-rail 20 thus providing a second degree of mobility of probe 12. Finally, x-rail 20 is part of a bridge structure 16 which is coupled to table 11 by a further series of air bearings illustrated at 26 in FIG. 1. Bridge 16 is driven by IF-axis drive motor 29 in the direction perpendicular to the page (the y direction). Air bearings 26 maintain the position of bridge 16 to table 11 in the x and z directions. In this structure, probe 12 can be moved three dimensionally. The actual drive mechanisms for moving the various components such as (1) z-rail 18 relative to carriage 24 or (2) carriage 24 relative to x-rail 20 or (3) bridge relative to table 11 may be of a variety of types such as hydraulic, rack and pinion, or gear driven. The actual driving mechanism, is conventional and will not be discussed further herein.

Figure 2:
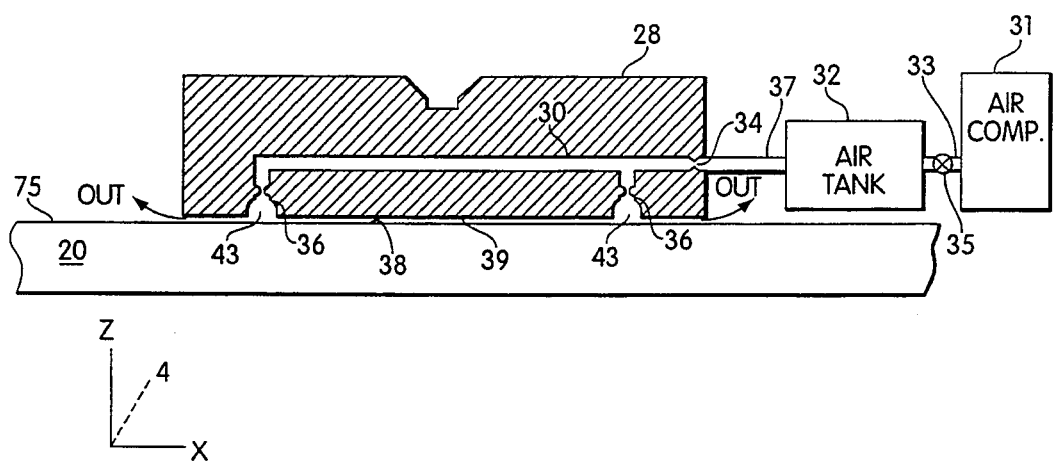
FIG. 2 is a cross-sectional view of a typical prior art air bearing.

FIG. 2 is a cross-sectional view of an exemplary prior art air bearing in greater detail. FIG. 2, for instance, may be one of the air bearings coupling carriage 24 to x-rail 20 and will be described as such. Bearing shoe 28 is fixedly mounted to carriage 24 and is positioned adjacent to x-rail 20. Air compressor 31 supplies air to air tank 32 through outlet 33 and valve 35. Air tank 32 is coupled to main channel 30 in shoe 28 through flexible hose 37, pressure regulator 41 and orifice 34. When the machine is turned on, air compressor 31 is feedback controlled to maintain a specified pressure in air tank 32, e.g., 10–12 atmospheres. When the machine is in full operation mode, orifice 34 is open such that pressurized air escapes through hose 37 into main channel 30 of air bearing shoe 28. Main channel 30 in this instance is an annular reservoir which is fluidly coupled to gap 43 via channels 36. The pressurized air in main channel 30 flows into gap 43 via channels 36, and escapes from gap 43 as shown by the arrows labeled "out" in FIG. 2. This flow of pressurized air maintains the gap between surface 39 of shoe 28 and surface 75 of x-rail 20 thus providing essentially frictionless support between carriage 24 and x-rail 20. Carriage 24 (which is fixedly coupled to bearing shoe 28) can then be slid in a horizontal direction (the x direction) relative to x-rail 20 by a drive mechanism (not shown). The air bearings maintain relatively frictionless support between the parts and the relative orientation of the parts in the y and z directions.

When probe 12 is stationary and is not conducting a measurement (i.e., when the machine is inactive), it is not necessary that the pressure in the air bearing gap 43 be maintained. The primary purposes of the air bearing are (1) to maintain accurate positioning of carriage 24 with respect to x-rail 20 in directions orthogonal to the direction in which carriage 24 moves along x-rail 20, and 2) to maintain essentially frictionless support between the two members so as to minimize wear and maximize the speed with which relative movement can be made. Thus, when the probe is not making a measurement or moving, there is no reason to maintain the air pressure in the air bearing.

Accordingly, the present invention provides an air bearing system in which the air supply to the bearing gap is interrupted during extended periods of machine inactivity (i.e., the probe is not moving or making a measurement).

Figure 3:
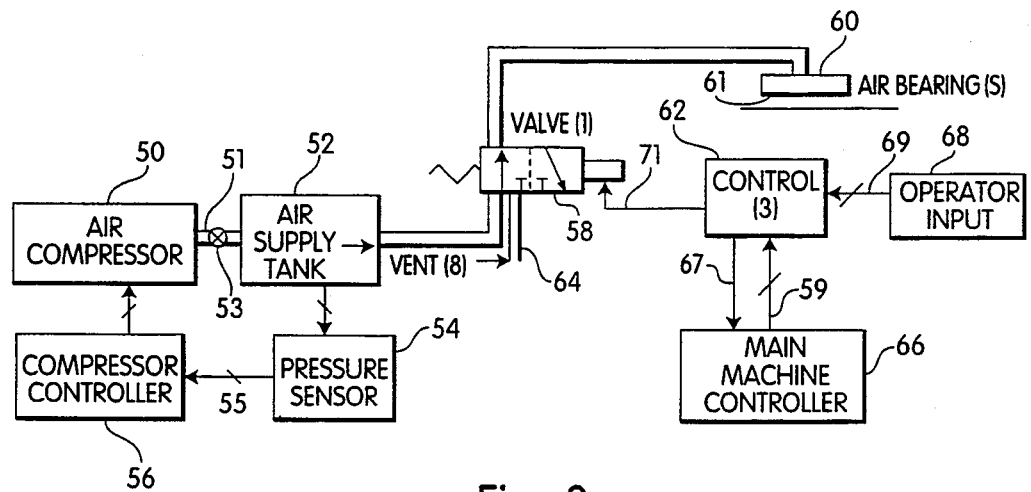
FIG. 3 is a schematic diagram of a machine having air bearings and embodying the present invention.

FIG. 3 is a schematic of the air bearing system of the present invention which can be used with any type of machine including that shown in FIGS. 1 and 2. An air compressor 50 supplies pressurized air to air supply tank 52 via hose 51 and valve 53. The pressure sensor 54 senses the pressure in the supply tank 52 and provides a signal via line 55 to compressor controller 56 indicating the instantaneous pressure in supply tank 52. Compressor controller 56 is programmed to turn on air compressor 50 when the pressure in tank 52 drops below a certain specified pressure, e.g., 10 atmospheres, and to turn off air compressor 50 when the pressure in air supply tank 52 rises above a second specified pressure, e.g., 12 atmospheres. In this manner, the pressure in air supply tank 52 is maintained between the two pressures. Air supply tank 52 is vented through regulator 57 and valve 58 into air bearing 60.

Operation of valve 58 is controlled by a control circuit 62. Valve 58 can be placed by control circuit 62 into one of two positions, open or closed. In the open position, valve 58 couples air supply tank 52 to air bearing 60 in accordance with normal operation of the bearing. In the closed position, the outlet of air supply tank 52 is sealed and air bearing 60 is coupled to vent 64 which allows the air pressure in the bearing 60 to be released more quickly than only through the gap 61.

Controller 62 of valve 58 is coupled to receive a signal 59 from the main machine controller 66. The main controller 66 is designed to assert signal line 59 every time the probe is moved or a measurement is obtained. Controller 62 is programmed to switch valve 58 from the open position to the closed position if signal line 59 from the main machine controller 66 is not asserted for a certain period since the last input. Thus, if the machine remains idle for longer than the specified time period, valve 58 is switched to the closed position (i.e., air bearing 60 is turned off). The valve controller 62 is further programmed to provide a signal on line 67 to the main machine controller 6, which signal is asserted when the air bearing has been turned off. The main machine controller 66 is programmed to inhibit movement of probe 12 and measurement when the signal on line 67 is asserted.

In at least one preferred embodiment of the invention, the machine further comprises an operator input device 68 such as a push button, mouse, light pen or touch screen through which an operator can input an instruction indicating that the air bearing 60 is to be turned on. Alternately, or in addition, the operation of any button on the machine can be used as a signal indicating that the bearing is to be activated. The input device 68 is coupled to the valve controller 62 via signal line 69. When the operator enters the instruction to turn on the air bearing, line 69 is asserted and controller 62, responsive to the assertion of line 69, switches valve 58 from the closed to the open position via control line 71. Simultaneously, signal line 67 to main machine controller 66 is brought to the unasserted state. In the preferred embodiment, there is a time delay before line 67 is unasserted in order to provide a period for the air pressure in the air bearing to build up to full pressure.

It should be understood by those skilled in the art that the description of the electronic control of the bearing is merely one possible operation protocol for controlling valve 58. For instance, control line 59 from the main machine controller 66 to the valve controller 62 might, alternately, be asserted by main machine controller 66 after a specified time period of inactivity, in which case valve controller 62 would be programmed to switch valve 58 to the closed position whenever line 59 is asserted, as opposed to when it is unasserted for a specified time interval. Even further, in another alternative embodiment, the function of controller 62 may simply be incorporated within the programming of main machine controller 66 and therefore eliminate the need for a separate valve controller.

Figure 4:
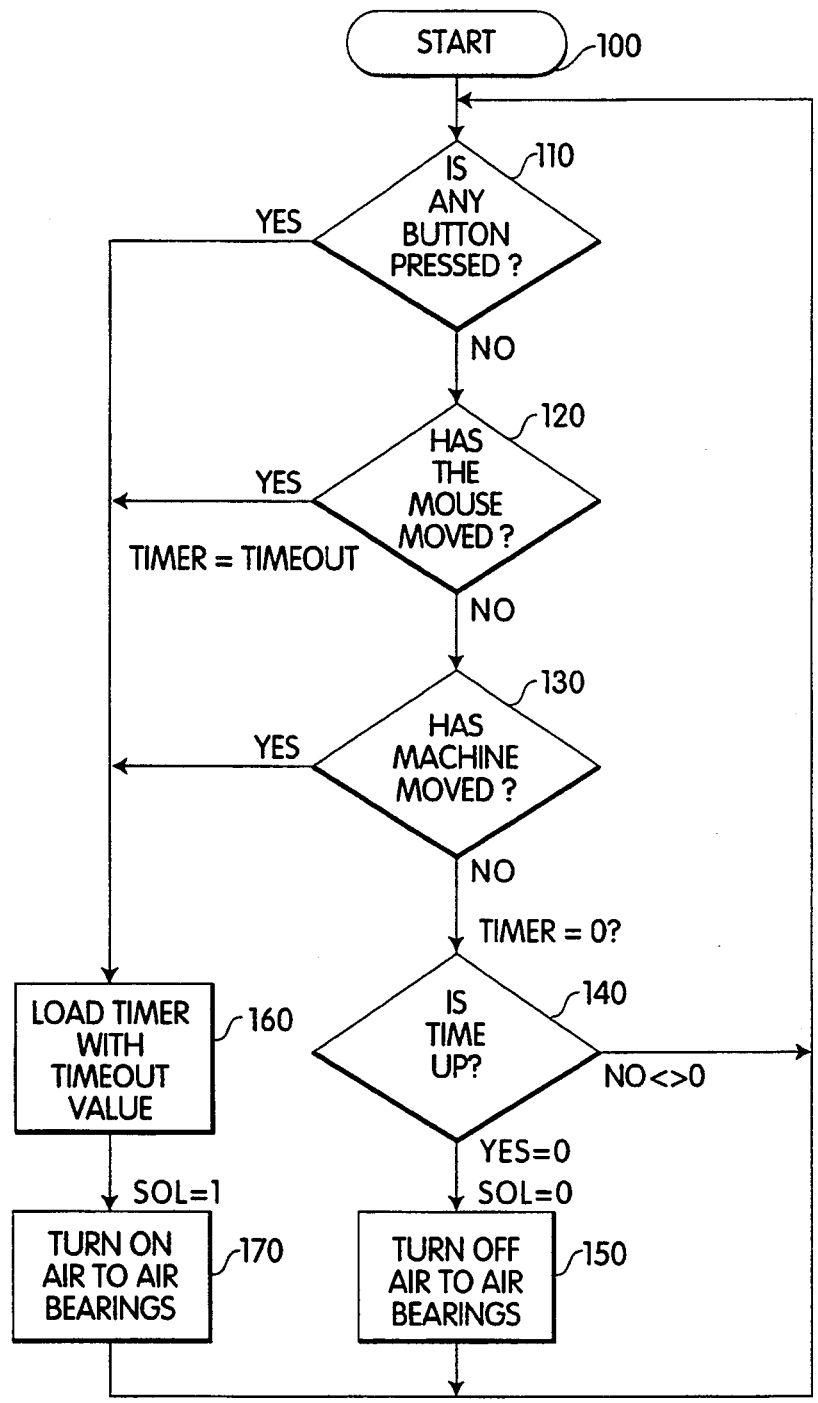
FIG. 4 is a flowchart illustrating the operation of the valve controller of the present invention.

FIG. 4 is a flowchart illustrating the operation of the valve controller in one preferred embodiment of the present invention. In the embodiment illustrated by FIG. 4, the operator can turn the air bearing on by use of either a button on a keyboard or a mouse. It is further assumed that the valve controller includes or has access to a clock which continuously counts down at a specified rate. Therefore, the operation of the clock is not shown in the flow chart.

The program starts at step 100. In step 110, the valve controller determines if any button on the keyboard has been pressed by the operator to turn the air bearing on. If it has not, procedure flows to step 120 where the controller determines if the mouse has been operated indicating that the air bearing is to be turned on. If not, procedure flows to step 130 where the controller determines if the probe has been moved or a measurement has been taken since the last passage through the procedure loop. If it has not, the controller checks the clock to determine if the specified period of time of inactivity has elapsed. If it has not, programming loops back around to step 110. However, if the timer has run out, procedure flows to step 150 where the air bearing is turned off and then procedure loops back around to step 110.

If the operator has pressed a button on the keyboard or operated the mouse, or if the probe has moved or taken a measurement, then the timer must be reset and the air bearing turned on. Accordingly, if the answer to any of steps 110, 120 and 130 is "yes", procedure flows therefrom to steps 160 and 170 where the timer is reset and the air bearing is turned on. Of course, the air bearing may already be on, in which case turning the air bearing on again has no effect. After step 170, the procedure loops back around to step 110.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. Apparatus for controlling air flow to an air bearing for providing support between first and second parts of a machine which are movable relative to each other, said apparatus comprising;
   an air supply,
   means coupling air from said air supply to the air bearing,
   a valve within said coupling means, said valve being selectively positionable in a first position in which air from said air supply is coupled to the air bearing and in a second position in which said coupling means is closed in which air from said air supply is not coupled to the air bearing, and
   valve control means for switching said valve from the open position to the closed position when the machine has been inactive for a specified time interval.

2. Apparatus as set forth in claim 1 wherein said control means comprises a microprocessor.

3. Apparatus as set forth in claim 1 wherein, when said valve is closed, said air tank is sealed such that air does not escape from said air tank.

4. Apparatus as set forth in claim 3 wherein said machine further comprises a main machine controller and wherein said main machine controller and said valve control means are integrated in a single microprocessor.

5. Apparatus as set forth in claim 3 wherein said machine further comprises a main machine controller and wherein said means for controlling said valve is responsive to a signal from said main machine controller indicative of the time elapsed since the last machine activity.

6. Apparatus as set forth in claim 5 wherein said machine is a coordinate measuring machine and said machine is inactive when there is no relative movement between said first and second parts of said machine.

7. Apparatus as set forth in claim 1 wherein, when said valve is in said closed position, said valve couples said air bearing to a release port whereby air can escape from said air bearing through said release port.

8. Apparatus as set forth in claim 6 wherein said coordinate measuring machine comprises a main machine controller for controlling operation of said machine including control of relative movement of said first and second parts and measuring, and wherein said main machine controller is coupled to said valve control means so as to provide an operation signal to said valve control means which signal is asserted each time the machine is active and further wherein said valve control means comprises a timing circuit for tracking the time interval since said operation signal has been asserted.

9. Apparatus as set forth in claim 8 wherein said main machine controller and said valve control means are integrally formed in a microprocessor.

10. Apparatus as set forth in claim 1 further comprising an input device through which an operator can input a signal instructing said valve control means to switch from the closed position to the open position.

11. Apparatus for controlling air flow to an air bearing which provides support between first and second parts of a coordinate measuring machine, which parts are movable relative to each other, said apparatus comprising;
    an air tank for holding air under pressure,
    a pressure sensor coupled to said air tank for sensing the air pressure in said tank,
    an air compressor coupled to said air tank and said pressure sensor for supplying air to said tank, said compressor further coupled to said pressure sensor,
    an air bearing,
    an air path coupling air from said air tank to said air bearing,
    a valve within said air path, said valve being selectively positionable in an open position in which air from said air supply is coupled to said air bearing and in a closed position in which said air path is closed such that air cannot escape from said air tank, and
    a valve controller for switching said valve from the open position to the closed position when said machine has been inactive for a specified time interval.

12. Apparatus as set forth in claim 11 wherein said valve controller comprises a microprocessor.

13. Apparatus as set forth in claim 12 wherein said machine further comprises a main machine controller and wherein said valve controller is responsive to a signal from said main machine controller indicative of the time elapsed since said machine has bee active.

14. Apparatus as set forth in claim 13 wherein, when said valve is in said closed position, said valve couples said air bearing to a release port whereby air can escape from said air bearing through said release port.

15. Apparatus as set forth in claim 12 wherein said main machine controller is coupled to said valve controller so as to provide an operation signal to said valve controller, which signal is asserted each time said machine is active and further wherein said valve controller comprises a timing circuit for tracking the time interval since said operation signal has been asserted.

16. Apparatus as set forth in claim 15 further comprising an input device through which an operator can input a signal instructing said valve controller to switch from the closed position to the open position.

17. Apparatus as set forth in claim 16 wherein said input device includes all controls for operating said machine.

18. A method of controlling a machine having an air bearing for providing support between first and second machine parts which are movable relative to each other, said method comprising the steps of;
    (1) providing air to said air bearing when the machine is fully operating,
    (2) determining the time interval since said machine has been active, and
    (3) interrupting the provision of air to said air bearing when said time interval exceeds a specified period.

19. A method as set forth in claim 18 wherein said machine is a coordinate measuring machine and step 2 comprises the steps of;
- (2.1) determining the time interval since there has been relative movement between said first and second machine parts or since a measurement was obtained, whichever is smaller.

20. A method as set forth in claim 19 wherein said air is provided to said air bearing from an air tank containing pressurized air, and wherein said air tank is supplied with air from an air compressor which supplies said air responsive to the pressure in said tank dropping below a specified pressure, said tank being coupled to said air bearing through a valve, wherein step 3 comprises the step of;
- (3.1) closing said valve such that air cannot escape from said tank.

21. A method as set forth in claim 20 wherein said machine further comprises an input device through which an operator can input a signal indicating that said provision of air to said air bearing is to be resumed, said method further comprising the step of;
- (4) opening said valve responsive to said signal such that said air in said air tank is coupled to said air bearing.

* * * * *